United States Patent Office 3,420,094
Patented Jan. 7, 1969

1

3,420,094
APPARATUS FOR MEASURING PERMEABILITY
Alfred Schmid, Buena Vista, Coahuila, Mexico, and Heinz Nyffenegger, Villnachern, Switzerland, assignors to Cementfabrik Holderbank-Wildegg AG., Holderbank, Aargau, Switzerland, a corporation of Switzerland
Filed Sept. 26, 1966, Ser. No. 582,105
Claims priority, application Switzerland, Oct. 4, 1965, 13,628/65
U.S. Cl. 73—38                                    5 Claims
Int. Cl. G01m 3/00

ABSTRACT OF THE DISCLOSURE

An apparatus for measuring the gas permeability of a specimen of material comprises a closed container partly filled with liquid. The gas space in the container communicates with a gas flow path which contains the specimen. An open container, containing a liquid, is connected by a liquid-filled transfer path to the closed container. The liquid levels are different and means are provided to position one of the containers so that a constant head is maintained by the transfer of liquid between the containers when gas flows through the specimen. The rate of displacement of liquid through the path is determined and the permeability of the specimen may be derived from this determination.

Figure 1:
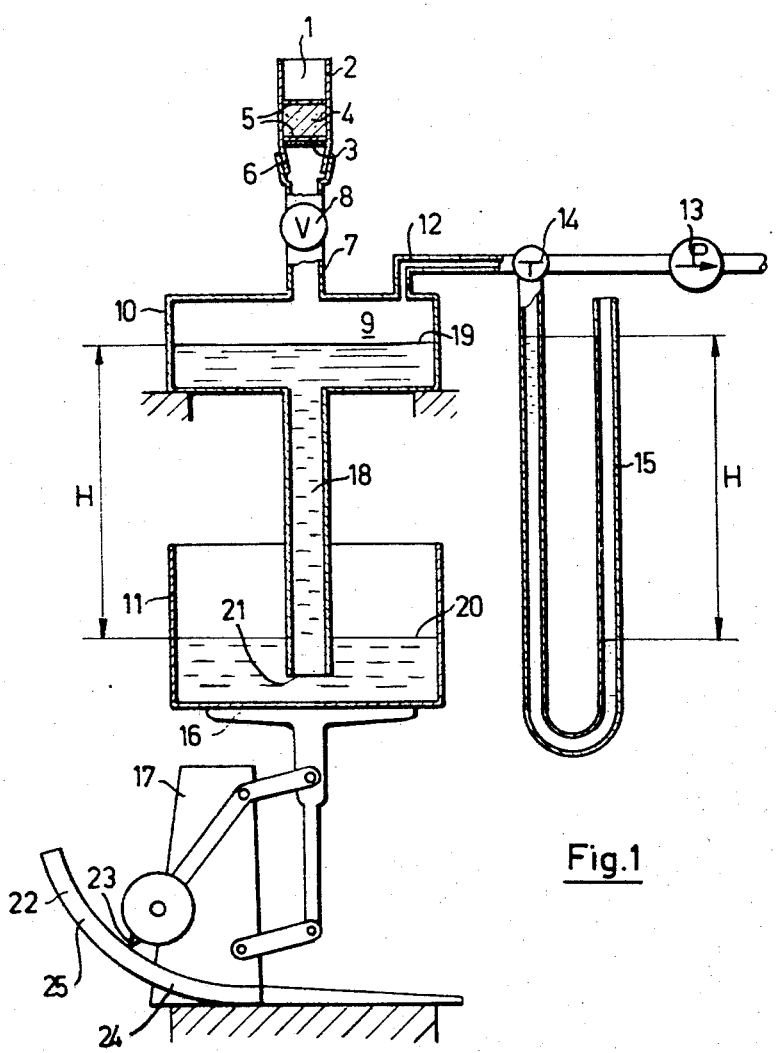

This invention relates to an apparatus for measuring permeability of material in powder form which comprises a permeability cell and also a quantity meter which is connected to the discharge end of the cell, comprises a gas zone, contains measuring liquid and determines by means of liquid displacement the quantity of the gas flowing through the permeability cell, the gas zone of the meter being adapted to be connected to a device producing a vacuum.

In numerous branches of industry, it is necessary to determine the specific surface of material in powder form, such as more especially in the cement industry for determining the surface of the raw cement powder and of the cement, but for example also in foundries, for determining the specific surface of the moulding sand, and also in the ceramics industry and in comparable branches of industry. One of the methods widely used for this purpose is the measurement of the gas permeability of a compressed element consisting of the pulverulent material to be investigated.

For carrying out such a permeability measurement, numerous apparatus which are however basically the same have been developed; the apparatus according to Blaine has become of most importance in the cement industry. This apparatus and its use are described in ASTM Designation: C204–55. This apparatus and comparable apparatus comprise a permeability cell which receives the pressed element consisting of the material to be investigated, the said cell being positioned at a pressure gradient, two liquid columns communicating with one another in a U-tube causing the pressure difference. These arrangements have the defect that the pressure difference effective for the measurement constantly decreases during the measurement. As a consequence, the accuracy of the measurement suffers and in addition time-consuming calculations are necessary in order to determine the specific surface of the tested material from the throughflow times for a prescribed gas volume. An additional disadvantage of these arrangements is that the quantity of material which can be examined in each measuring operation is very small and consequently is not truly representative in every case.

2

The invention has for its object to overcome these disadvantages. For this purpose, a permeability measuring arrangement of the type hereinbefore set forth is so constructed according to the invention that the quantity meter comprises two measuring liquid containers which hold measuring liquid and are arranged one above the other, the upper measuring container being fixed in space, closed off from the surroundings and connected with its gas zone to the discharge end of the permeability cell, while the lower measuring liquid container is open at the top and rests on a weighing pan of a balance, a measuring liquid pipe fixedly connected to the upper measuring liquid container opening in its lower region into said container and extending to below the measuring liquid level in the said lower measuring liquid container, through which measuring liquid pipe a quantity of measuring liquid which corresponds to the gas quantity flowing through the permeability cell and which is displaced by the gas from the upper measuring liquid container flows into the lower measuring liquid container, and that the balance is so designed that the distance through which the weighing pan moves under the influence of the weight of the quantity of measuring liquid to be measured is as great as the sum of the lowering of the measuring liquid level in the upper measuring liquid container and of the simultaneous corresponding rise in the measuring liquid level in the lower measuring liquid container.

Figures 2, 3:
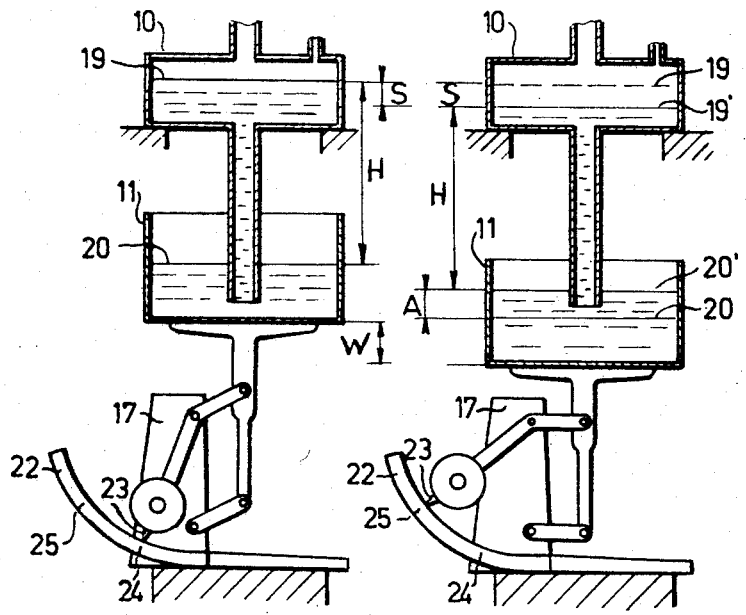

One embodiment of the invention is shown in simplified form and by way of example in the drawing, wherein:

FIGURE 1 is a permeability measuring arrangement according to the invention, partly in section, and FIGURES 2 and 3 show the quantity measuring device of FIGURE 1 in different working positions and to a smaller scale.

Parts which correspond to one another bear the same references in all figures.

The permeability measuring arrangement shown in FIGURE 1 comprises a known permeability cell 1. The permeability cell comprises a cylinder 2 with a screen plate 3, extending perpendicularly to the cylinder axis and it serves to receive the sample 4 of the material to be measured. This example consists of an always equal, accurately weighed quantity of fine-grain material which is to be tested, the said material being placed on the screen plate 3 between two filter papers 5, of which the flow resistance is negligibly small by comparison with that of the sample 4, the sample being compressed with a fitting piston to a constant height. The cylinder 2 of the permeability cell 1 is connected at its bottom end to a pipe section 7 by means of a conical plug connection 6 providing a seal with respect to the ambient atmosphere, the said pipe section containing a valve 8 and opening into the gas zone 9 of a quantity measuring device or meter.

The quantity meter comprises an upper measuring liquid container 10, in the upper region of which is disposed the said gas zone 9, and also a lower measuring liquid container 11. Both measuring liquid containers 10, 11 comprise vertical side walls and horizontal circular bottoms of the same area and are arranged coaxially in relation to one another. The upper measuring liquid container 10 is fixed in space, sealed off from the surroundings and adapted to be connected with its gas zone 9 through a vacuum pipe 12 to a vacuum pump 13. Contained in the vacuum pipe 12 is a three-way cock 14, of which the third union is connected to a manometer 15 consisting of a U-tube filled with liquid. The lower measuring liquid container 11 is open at its top and it rests on the weighing pan 16 of a balance 17. The distance travelled by the pan 16 of the balance under the action of the weight to be measured is proportional to this weight. A measuring liquid pipe 18 which is connected fast to the upper measuring liquid container 10 and is coaxial with both measuring liquid containers 10, 11 opens into the lower region of the measuring liquid container 10 and leads downwardly into the lower measuring liquid container 11. Measuring liquid is disposed in the upper measuring liquid container 10, in the measuring liquid pipe 18 and also in the lower measuring liquid container 11. The level of the liquid in the upper measuring liquid container 10 is indicated at 19 and the level in the lower measuring liquid container 11 is indicated at 20. There is communication between the measuring liquid in the two measuring liquid containers 10, 11 by way of the measuring liquid pipe 18, of which the bottom opening 21 is below the liquid level 20 in the lower liquid container 11. The vacuum in the gas zone of the upper measuring liquid container 10 on the liquid level 19 in the latter, on the one hand, and the ambient pressure on the liquid level 20 in the lower measuring liquid container 11, on the other hand, act in such a way that a measuring liquid column of the height H determined by the upper liquid level 19 and the lower liquid level 20 is maintained. Corresponding to this height H of the liquid column is also the difference in the heights of the two communicating liquid columns in the manometer 15.

The balance is so designed that the movement of the pan 16 under the influence of the weight of the quantity of measuring liquid which flows from the upper measuring liquid container 10 through the measuring liquid pipe 18 into the lower measuring liquid container 11 is as great as the sum of the fall of the liquid level 19 in the upper measuring liquid container 10 and of the simultaneous corresponding rise of the liquid level 20 in the lower measuring liquid container 11. Since the two measuring liquid containers 10, 11 comprise vertical side walls and bottoms of the same area, and consequently a fall in the liquid level 19 results in a corresponding equivalent rise in the liquid level 20, the distance moved by the pan 16 as measuring liquid flows from the upper container 10 into the lower container 11 amounts to double the fall of the liquid level 19 in the upper container 10 or of the rise of the liquid level 20 in the lower container 11.

The permeability measuring arrangement as illustrated operates as follows. The valve 8 is closed and the three-way cock 14 is rotated into the position shown in the drawing. The air in the gas zone 9 of the upper measuring liquid container is extracted by the vacuum pump 13. As a result, the liquid level 19 in the upper measuring liquid container 10 is raised, and measuring liquid is lifted from the lower measuring liquid container 11 through the measuring liquid pipe 18 into the upper measuring liquid container 10. The three-way cock 14 is then rotated into that position in which the gas zone 9 of the upper liquid container 10 communicates with the manometer 15, but is separated from the vacuum pump 13.

A reduced pressure with respect to the ambient pressure prevails in the gas zone 9 of the upper measuring liquid container 10, said reduced pressure depending on the height H of the liquid column as determined by the liquid level 19 and by the liquid level 20. If now the valve 8 is opened, ambient air flows under the action of this reduced pressure or vacuum through the sample of material in the cylinder 2 of the permeability cell 1 and into the gas zone 9 of the upper measuring liquid container 10. Depending on the quantity of gas which flows into the gas zone 9 of the upper measuring liquid container 10, measuring liquid is displaced from this upper container 10 and through the measuring liquid pipe 18 into the lower container 11.

The measuring liquid flowing from the upper container 10 to the lower container 11 increases the weight of this lower measuring liquid container 11 which rests on the weighing pan 16. As a consequence, the said pan 16 descends under the influence of the weight of the measuring liquid which has flowed into the container, and the weight of this additional liquid can be read off on the scale 22 of the balance, and since the specific gravity of the measuring liquid (uusually water) and also the weight of the gas (air) flowing through the permeability cell 1 are known. it is directly possible to determine the quantity of gas which flows during a prescribed period of time through the sample 4 of the material, from which the specific surface of said material can be easily calculated in known manner. In practice, it is advantageous to measure the time within which the indicating pointer 23 of the balance 17 moves from one weight graduation to the other.

The actual time measurement is only established after a certain small quantity of measuring liquid has already flowed from the upper into the lower measuring liquid container and constant flow conditions have been established in the permeability cell.

Since the applied differential pressure remains constant throughout the entire measuring period, the result of the time measurement for the prescribed gas volume can be analogously converted to a value which is proportional to the specific surface of the test material in $cm.^2/g.$ according to Blaine. Consequently, it is possible for the time of measurement to be analogously converted, for example, into an electric signal, which is applied to an electric indicating instrument calibrated according to Blaine, from which instrument the specific surface of the material being tested can be directly read off.

In FIGURES 2 and 3, the quantity meter is in each case shown in an operative position in which the indicating pointer 23 of the balance is indicating one of the readings 24 and 25 on the weight scale 22. In FIGURE 2, a comparatively large quantity of measuring liquid is still in the upper measuring liquid container 10, and the pointer 23 of the balance 17 is at the calibration 24 on the weight scale 22. The height of the liquid column is determined by the upper measuring liquid level 19 and by the lower measuring liquid level 20. FIGURE 3 shows the quantity meter in an operative position in which such a quantity of measuring liquid has flowed from the upper into the lower measuring liquid container 11 that the upper measuring liquid level has fallen by the amount S; the original liquid level 19 corresponding to the operative condition according to FIGURE 2 is represented by a broken line and the new liquid level is indicated at 19'. The liquid level in the lower measuring liquid container 11 has correspondingly risen by the amount A; the original liquid level 20 is represented by a broken line and the new measuring liquid level is indicated at 20'. The amounts S and A are quantitatively equal to one another. Under the influence of the weight of the quantity of measuring liquid which has flowed from the upper measuring liquid container into the lower container, the pan 16 has moved downwardly by the distance W and the pointer 23 of the balance 17 is pointed at the calibration 25 on the scale 22. The travel W corresponds to the sum of the fall S in the liquid level of the upper measuring liquid container and the rise A in the liquid level of the lower measuring liquid container. The result of this is that the height H of the measuring liquid column, which is determined by the upper measuring liquid level and the lower measuring liquid level, is the same with each height position of the lower measuring liquid container 11 which is resting on the balance pan 16 and thus in any operative position of the quantity meter, as will be seen from FIGURES 2 and 3.

By the measures according to the invention, a permeability measuring arrangement is obtained in which a pressure difference of practically any value which can be selected can be kept constant with simplest possible means over a measurement period corresponding to any requirement, with which permeability measuring arrangement it is for each measurement possible to check a quantity of material which can be chosen to be practically any size, and of which the measurement results can be directly converted to the specific surface of the test material in cm.²/g. according to Blaine.

Instead of the bottoms of the measuring liquid containers having the same surface area, they can also have a different surface area, for also with this method of construction, it is possible to achieve the effect that the distance the weighing pan moves under the influence of the weight of the quantity of measuring liquid to be measured is as great as the sum of the fall of the upper measuring liquid level and the rise of the lower liquid level.

If necessary, by sloping the side walls of one or the other measuring liquid container, the characteristic of the movement of one or both liquid levels can be adapted to a non-linear characteristic of the ratio between travel and weight of the balance.

The height of the measuring liquid column and thus the value of the pressure difference can be varied by altering the vertical spacing of the two measuring liquid levels from one another. This is advantageously effected by altering the height position of the upper measuring liquid container in relation to the balance, it obviously being necessary to ensure that the measuring liquid tube dips as described into the measuring liquid in the lower measuring liquid container.

The bottoms of the measuring liquid containers can be of any desired form and more especially rectangular and the measuring liquid containers can be offset from one another in a horizontal direction; similarly, the measuring liquid tube can be connected to the bottom of the measuring liquid container in any desired region of said bottom and open into the interior of the lower measuring liquid container in any desired region of said bottom in a horizontal direction, and it can extend in any desired direction instead of being vertical.

In the constructional example as illustrated, a sloping balance has been shown for the sake of illustration. In the practical construction, however, a spring balance may be used, because such a balance can be more easily arranged to have a linear characteristic.

What is claimed is:

1. Means for measuring the gas permeability of material comprising:
  (a) first and second containers each of which contains liquid to provide therein liquid spaces, the first container being closed and only partly filled with liquid to define therein a gas space;
  (b) a liquid-filled transfer path extending between said liquid spaces, the ends of said transfer path being always covered by liquid in the containers;
  (c) a gas flow path containing said specimen and having one end in communication with the gas space of the closed container and having a constant gas pressure at its opposite end;
  (d) the liquid in said second container being subject to a gas pressure;
  (e) means establishing in the gas space of the closed container a pressure different from said constant pressure existing at the end of said flow path, thereby establishing the positions of the liquid levels in said containers relatively to one another;
  (f) means positioning one of said containers so as to maintain unchanged the positions of the liquid levels relatively to one another when gas flows through said specimen; and
  (g) means measuring the displacement of liquid from one container to the other.

2. The combination defined in claim 1, in which said means, positioning one of said containers so as to maintain unchanged the positions of the liquid levels, consists of a balance on the weighing pan of which said one container is arranged, said balance being so designed that the distance moved by said weighing pan under the influence of the weight of the quantity of liquid flowing from one container into the other container when gas flows through said specimen is as great as the sum of the fall of the level of the liquid in one container and the simultaneous corresponding rise of the level of the liquid in the other container.

3. The combination defined in claim 1 in which
  (a) the liquid level in the first container is above that in the second container, and
  (b) said constant pressure and said gas pressure are atmospheric pressure.

4. The combination defined in claim 1 in which
  (a) the means positioning one of the containers is a balance on the weighing pan of which is the second container and in which balance the displacement of the weighing pan is equal to sum of the fall of the liquid level in the first container and the rise of the liquid level in the second container.

5. The combination defined in claim 4 in which the displacement of the weighing pan is a linear function of the weight of liquid in the second container and in which the side walls of both containers are vertical.

References Cited

UNITED STATES PATENTS

| 1,660,024 | 2/1928 | Abrams | 73—38 |
| 2,392,637 | 1/1946 | Boehler | 73—38 |

LOUIS R. PRINCE, *Primary Examiner.*

W. HENRY, *Assistant Examiner.*

UNITED STATES PATENT OFFICE
CERTIFICATE OF CORRECTION

Patent No. 3,420,094                                    January 7, 1969

Alfred Schmid et al.

It is certified that error appears in the above identified patent and that said Letters Patent are hereby corrected as shown below:

Column 5, line 53, "said specimen" should read -- a specim of said material --.

Signed and sealed this 10th day of March 1970.

(SEAL)
Attest:

Edward M. Fletcher, Jr.                              WILLIAM E. SCHUYLER, JR.
Attesting Officer                                              Commissioner of Patents